United States Patent

Siol et al.

[11] Patent Number: 5,872,202
[45] Date of Patent: Feb. 16, 1999

[54] POLYMETHACRYLATE MOLDING COMPOUND WITH ETHYLENE

[75] Inventors: Werner Siol, Darmstadt; Michael Wicker, Seeheim-Jugenheim, both of Germany

[73] Assignee: Roehm GmbH, Darmstadt, Germany

[21] Appl. No.: 945,268

[22] PCT Filed: Feb. 5, 1997

[86] PCT No.: PCT/EP97/00503

§ 371 Date: Dec. 22, 1997

§ 102(e) Date: Dec. 22, 1997

[87] PCT Pub. No.: WO97/31043

PCT Pub. Date: Aug. 28, 1997

[30] Foreign Application Priority Data

Feb. 24, 1996 [DE] Germany ............ 196 07 003.1

[51] Int. Cl.⁶ ............................... C08F 220/10
[52] U.S. Cl. .................. 526/328.5; 526/329.2; 526/329.3; 526/329.5
[58] Field of Search ............... 526/328.5, 329.2, 526/329.3, 329.5

[56] References Cited

U.S. PATENT DOCUMENTS

| | | | |
|---|---|---|---|
| 3,900,453 | 8/1975 | Shimada et al. | 526/328.5 |
| 4,384,097 | 5/1983 | Wingler et al. | 526/328.5 |
| 5,026,807 | 6/1991 | Ohira et al. | 526/324 |
| 5,506,322 | 4/1996 | Ichikawa et al. | 526/328.5 |

FOREIGN PATENT DOCUMENTS

| | | | |
|---|---|---|---|
| 57-149313 | 9/1982 | Japan | 526/328.5 |
| 60-262807 | 12/1985 | Japan | 526/328.5 |
| 0971673 | 9/1964 | United Kingdom | 526/328.5 |

*Primary Examiner*—Bernard Lipman
*Assistant Examiner*—N. Sarofim
*Attorney, Agent, or Firm*—Oblon, Spivak, McClelland, Maier & Neustadt, P.C.

[57] ABSTRACT

The invention relates to a molding mass which can be thermoplastically processed, characterized in that it consists of monomer units of a) 80–99.9 wt.-% methyl methacrylate, b) 0.1–20 wt.-% ethylene, c) 0–19.9 wt.-% other comonomers.

The invention further relates to a method for the production of the molding mass, as well as molded elements made from it.

20 Claims, No Drawings

5,872,202

POLYMETHACRYLATE MOLDING COMPOUND WITH ETHYLENE

BACKGROUND OF THE INVENTION

1. Field of the Invention

The invention relates to molding masses which can be thermoplastically processed, which consist in great proportion of methyl methacrylate units and have ethylene as a comonomer.

2. Description of the Background

Molding masses of polymethyl methacrylate have been known for a long time and offer the advantages of good thermoplastic processability, high transparency, and good weather resistance. Such molding masses generally contain 80–99 wt.- % methyl methacrylate units, as well as a remaining portion of other monomer units such as acrylic acid esters or styrene.

The ceiling temperature Tc is that temperature of homopolymers at which polymerization and depolymerization are in equilibrium. It can therefore be used as a measure for the thermal resistance of a polymer. Pure polymethyl methacrylate has a relatively low ceiling temperature Tc of about 160° C. and therefore a relatively low stability against thermal decomposition. In this connection, it is essential for good processing stability that the polymethyl methacrylate chains do not contain any weak points, such as those caused by recombination or disproportionation of PMMA radicals. As a rule, PMMA molding masses are therefore produced with as little initiator as possible, in order to achieve good processing stability. Polymethyl methacrylate chains which were terminated by means of a transfer step (DE 43 40 887) are particularly stable.

Since polymethyl methacrylate molding masses are generally processed at much higher temperature, for example at approximately 200°–270° C. in injection molding processes, they are stabilized by means of copolymerization with other monomers, for example. Styrene or acrylic acid esters, for example, are usual comonomers (Tc=275° C. and approximately 400° C., respectively).

A particular advantage of these monomers results from the fact that they can be copolymerized with methyl methacrylate relatively well. Copolymerization parameters in radical polymerization, for example for the system methyl methacrylate=M1, methyl acrylate=M2 are r1=2.15, r2=0.40, for the system methyl methacrylate=M1, styrene=M2, they are r1=0.45, r2=0.44 (see, for example, Brandrup, J., Immergut, E. H., Polymerhandbook, 3rd Edition, 1989, John Eiley & Sons, N.Y.).

If, on the other hand, the copolymerization parameters of ethylene with methyl methacrylate are considered, it becomes clear that these compounds can be copolymerized with one another relatively poorly. Brown and Ham (J. Polymer Sci., Part A, Vol. 2, p. 3623, 1964) indicate the following r parameters for the system ethylene=M1 and methyl methacrylate=M2, for a temperature of 150° C.: r1=0.2, r2=17. This means that [in] a methyl methacrylate/ethylene system, even if there is only a small amount of methyl methacrylate being offered, the MMA will be built almost completely into the copolymer. On the other hand, even at a polymerization temperature of 150° C., for example, and a high pressure, a significant excess of ethylene will be required in order to copolymerize only small amounts of ethylene with methyl methacrylate.

Ethylene (meth)acrylate copolymers with methyl methacrylate portions of up to 60 wt.- % are known from R ätzsch (1971, Plaste und Kautschuk [Plastics and Rubber], 18, p. 402). Rätzsch describes copolymers of ethylene with increasing proportions of acrylates, including methyl methacrylate. According to Rätzsch, polymerization takes place at 1500 bar and temperatures of 200°–250° C. The copolymerization parameters under these conditions are about 0.17 for the ethylene and 18 for the methyl methacrylate, according to Rätzsch. Copolymers with approximately 60 wt.- % methyl methacrylate are classified as sticky. No information is given with regard to corresponding copolymers with higher proportions of methyl methacrylate.

Polymethyl methacrylate molding masses with corresponding commercially available molding masses with methyl methacrylate proportions of 80 wt.- % or more, which contain ethylene as the comonomer, are not known. This is probably primarily due to the disadvantageous copolymerization parameters, as indicated above, and due to the fact that ethylene must be processed as a gas under high pressure, which would require corresponding complicated systems.

SUMMARY OF THE INVENTION

The invention is based on the task of making available a polymethyl methacrylate molding mass which meets the increased requirements for thermoplastic processability, particularly at higher processing temperatures, in particular manner. Furthermore, the new molding mass was supposed to demonstrate additional advantages, for example with regard to water absorption or brittleness, as compared with conventional polymethyl methacrylate molding masses.

This task was accomplished by a molding mass which can be thermoplastically processed characterized in that it consists of monomer units of a) 80–99.9 wt.- % methyl methacrylate, b) 0.1–20 wt.- % ethylene, c) 0–19.9 wt.- % other comonomers.

It is essential for the invention that ethylene is used as a comonomer. The molding masses according to the invention cover broad ranges of possible applications, depending on their composition. Molding masses with a very high proportion of methyl methacrylate and lower proportions of ethylene are characterized by very great heat shape retention and great stability against thermal decomposition. It is assumed that the relatively great stability difference between the stable polymethyl methacrylate radical and the corresponding polyethylene radicals makes a decisive contribution towards the stabilizing effect of the polymethyl methacrylate polymer chains when ethylene radicals are formed during thermal depolymerization. Molding masses with a high proportion of ethylene and a reduced proportion of methyl methacrylate demonstrate little brittleness and a reduced tendency to absorb water. While comonomers which are conventionally used, such as butyl acrylate, primarily were supposed to increase the side chain mobility of the polymer, it is assumed that ethylene as the comonomer contributes to an increase in mobility of the polymer main chain, which makes it easier to equalize tensions. Since ethylene is non-polar, it becomes difficult to embed water molecules into the polymer matrix. The additional use of other comonomers usually used in methyl methacrylate molding masses, such as (meth)acrylic acid esters or styrene, permits a variation of the properties of the methyl methacrylate/ethylene copolymer in almost any desired manner.

DETAILED DESCRIPTION OF THE INVENTION

The invention is preferably carried out by means of radical polymerization of the monomers in the presence of polymerization initiators and molecular weight regulators. The molding masses according to the invention consist of 80–99.9 wt.-%, preferably 91–99.8 wt.-% methyl methacrylate, and 0.1–20 wt.-%, preferably 0.2–9 wt.-% ethylene. Other comonomers usually used in polymethyl methacrylate molding masses can be present in amounts of 0–19.9 wt.-%, preferably 0–8.8 wt.-%. The latter can be, for example, acrylic acid esters with preferably C1–C8 alkyl in the ester radical, preferably methyacrylate, methacrylic acid ester with preferably C1–C8 alkyl in the ester radical, (meth)acryl nitrile, (meth)acrylic acid amide, styrene, α-methyl styrene, vinyl esters, vinyl amides, maleic acid or their derivatives, as well as other copolymerizable monomers (see H. Rauch-Puntigam, Th. Völker, Acryl- und Methacrylverbindungen [Acryl and methacryl compounds], Springer-Verlag, 1967).

The Polymerization Process

In the polymerization process according to the invention, one proceeds from the pure monomers or the monomer mixtures, which can contain other usual additives such as mold parting agents, pigments, or clouding agents, in addition to the polymerization initiators and the molecular weight regulators. Usual amounts are approximately 0–10 wt.-%, generally not more than 5 wt.-% or less relatively to the monomers used. The use of such additives is not critical for the invention. Furthermore, it is possible to conduct the polymerization in solvents such as butyl acetate or toluene, for example. In this connection, a solvent concentration up to approximately 75 wt.-%, preferably 5–50 wt.-% relative to the total batch, is usually selected.

The polymerization initiators used are the ones usually used for radical polymerization of methacrylates, for example azo compounds such as azodiisobutyronitrile, as well as peroxides, such as dibenzoyl peroxide or dilauryl peroxide, dialkyl peroxides, such as di-tert.-butyl peroxide, or other peroxide compounds, such as t-butyl peroctanoate or percetals, as well as redox initiators (see in this regard, for example, H. Rauch-Puntigam, Th. Völker, Acryl- und Methacrylverbindungen [Acryl and methacryl compounds], Springer, Heidelberg, 1967, or Kirk-Othmer, Encyclopedia of Chemical Technology, Vol. 1, pages 286 ff., John Wiley & Sons, New York, 1978). Preferably, the polymerization initiators are used in amounts from $10^{-4}$ to 1 wt.-% with reference to the starting substances, especially preferably in amounts of $2 \times 10^{-4}$ to 0.1 wt.-%, and very especially preferably in amounts of $10^{-3}$ to 0.05 wt.-%.

The molecular weight regulators or chain transfer regulators used are also usual compounds, particularly mercaptans of the R—SH type, where R could stand for a cyclic or branched alkyl group with 2 to 20 carbon atoms. Examples that can be mentioned are n-butyl mercaptan, dodecyl mercaptan, tert.-dodecyl mercaptan, esters of thioglycolic acid, or functional mercaptans with 2 to 6 SH groups. The molecular weight regulators are preferably used in amounts of 0.05 to 5 wt.-% with reference to the starting substances (see also in this regard, for example, H. Rauch-Puntigam, Th. Völker, Acryl- und Methacrylverbindungen [Acryl and methacryl compounds], Springer, Heidelberg, 1967). Amounts of molecular weight regulators of 0.1 to 2 wt.-% are especially preferred, amounts of 0.2 to 1 wt.-% are very especially preferred.

Furthermore, other compounds such as $CCl_4$ or benzyl bromide can also be used for molecular weight regulation, for example. Compounds which contain halogens are less preferred, however.

At high polymerization temperatures, solvents such as toluene, for example, can also serve as chain transfer regulators. However, regulators of the R—SH or R'—H type are preferred, where R' can stand for alkyl, cycloalkyl, or aralkyl with 5 to 30 carbon atoms, such as cumol, for example, which are able to terminate the growing polymer chain with an H atom. A particularly well suited molecular weight regulator is dodecyl mercaptan, for example.

Polymerization can be carried out at temperatures of about 80°–280° C., depending on the pressure applied and the comonomer composition. Lower polymerization temperatures generally lead to increased formation of syndiotactic triads, which favor heat shape retention, in contrast to the isotactic triads which are formed at higher temperatures. At higher temperatures, higher reaction rates with less initiator consumption are generally achieved. High regulator/initiator ratios, such as at least 2:1, promote the thermal stability of the molding mass, since fewer unstable end groups are formed (see, for example, EP-B 245 647= U.S. Pat. No. 4,877,853 or EP-A 656 374). Radical polymerization of methyl methacrylate, ethylene, and any other comonomers is preferably carried out at 120°–250° C., particularly preferably at 140°–220° C., especially preferably at 150°–200° C. In this connection, the amount of ethylene being offered can be adjusted by means of the pressure. Usually, the work is carried out in a pressure range of 1–2000 bar. Pressures of 5–500 bar, especially 8–60 bar, are preferred.

The production of the polymethyl methacrylate/ethylene molding masses according to the invention is carried out either discontinuously, batchwise or preferably in a continuous process, where then the polymerization is preferably not carried out until complete reaction of the monomers.

In batch production, relaxation can take place in a larger vessel or in the sense of flash degassing, for example, after a reaction time which can be 10–120 min, preferably 20–60 minutes, depending on the temperature and pressure, for example. In this manner, non-polymerized monomer, particularly excess ethylene, can be removed from the polymer material. Because of the small amount of inclusion of the ethylene monomers in the copolymer, as is to be expected, the ethylene not used should be drawn off and recirculated to the polymerization process, in a continuous process. The polymerizate can be further degassed after relaxation. This can be done, for example, by means of an extruder with degassing zones. Residual monomers, methyl methacrylate or other comonomers which are separated in this way can also be passed back to the process, just like the ethylene. The copolymer can be discharged from the extruder, cooled and comminuted. In this form, it can be used for processing in injection molding, for example, or for extrusion.

In a preferred embodiment, the polymerization process is carried out in a continuous process, particularly on the basis of the disadvantageous copolymerization parameters, where a large portion of the ethylene and also parts of the methyl methacrylate as well as any other monomers are removed from the mixture of polymer/monomer and solvent at a total reaction amount of 20–95%, preferably 40–90%, particularly 50–80%. By means of polymerization with incomplete conversion, grafting or crosslinking of the polymer, as can occur when a small amount of monomer is offered, is also prevented.

For example, polymerization can take place in a stirrer at 160° C. and a reaction rate of about 50% (see, for example, EP 691 351 A1). Initiation can take place by means of continuous addition of an initiator, for example 2,2'-azobis-(isobutyronitrile). The reaction in the reactor is kept in equilibrium by metering in methyl methacrylate/ethylene and discharging the mixture which has been polymerized to about 50%. Degassing can take place, for example, as described in EP-A 0 691 351. The monomers separated out can be recirculated into the polymerization process.

Likewise, it is possible to remove the ethylene from the process circuit, particularly if the proportion of ethylene in the copolymer is small, for example 0.2 wt.-%. Further processing of the molding mass, i.e. cooling and granulation, can take place in known manner (see, for example, EP-A 0 691 351).

Copolymers with a solution viscosity in chloroform according to ISO 1628-6 of 40–200 cm3/g are preferred. In this connection, molding masses with solution viscosities of 40–120 cm3/g are primarily used in injection molding, while copolymers with solution viscosities of 70–200 cm3/g are particularly well suited for extrusion.

EXAMPLES

Example 1

A mixture of 0.1 g di-tert.-amyl peroxide, 0.12 g methyl-3-mercaptopropionate, and 100 g methyl methacrylate in 150 g toluene is filled into an autoclave with a volume of 0.5 l, with a stirrer and pressure gauge. The reactor is rinsed twice by pressing on argon at 50 bar and subsequent relaxation. Then ethylene is pressed on at a pressure of 50 bar. The ethylene pressure first drops to approximately 37 bar (due to the partial dissolution of the ethylene in the toluene/methyl methacrylate mixture). By pressing ethylene on again, a pressure of 50 bar is adjusted again. Then the temperature in the reactor is increased from initially 28° C. to 157° C. This causes the pressure to increase to approximately 85 bar. Stirring takes place for approximately 50 min, at 157°–159° C. Then cooling to 49° C. takes place over a period of 2 hours, followed by relaxation.

This results in a clear, low-viscosity solution. To purify the polymerizate, the solution is precipitated with 10 times the amount of petrol ether. The polymer is filtered and vacuum-dried. The polymer obtained demonstrates the following properties:

Solution viscosity in chloroform according to ISO 1628-6: J value 29 ml/g $T_g$:94° C.

(Assuming a $T_g$ value of −80° C. for polyethylene and 112° C. for polymethyl methacrylate, an ethylene content of approximately 5 wt.-% in the copolymer can be calculated according to Flory-Fox).

According to an NMR determination, the copolymer contains approximately 4–5% ethylene units.

Thermostability, measured at a heating rate of 5° C./min. The maximum of the decomposition speed ($T_{\lambda max}$) is not reached until 393.5° C. At 360° C., only approximately 10% of the polymer has been broken down.

Example 2 (Comparison example)

The method of procedure is the same as in Example 1, but no ethylene is pressed on.

The polymerizate obtained has the following properties:

Solution viscosity in chloroform according to ISO 1628-6: J value 24 ml/g $T_g$:112° C.

Thermostability, measured at a heating rate of 5° C./min. The maximum of the decomposition speed ($T_{\lambda max}$) is reached at 373° C. At 290° C., approximately 10% of the polymer has been broken down.

We claim:

1. Molding mass which can be thermoplastically processed, characterized in that it consists of monomer units of
   a) 91–99.8 wt.-% methyl methacrylate,
   b) 0.2–9 wt.-% ethylene,
   c) 0–8.8 wt.-% other comonomers,
   said molding mass having a solution viscosity in chloroform according to ISO 1628-6 of 20–250 cm³/g.

2. Molding mass which can be thermoplastically processed, according to claim 1, characterized in that it has a solution viscosity in chloroform according to ISO 1628-6 of 40–200 cm³/g.

3. Molding mass which can be thermoplastically processed, according to claim 1, characterized in that the residual ethylene content is below 1000 ppm.

4. Method for the production of a molding mass which can be thermoplastically processed, according to claim 1, characterized in that polymerization is carried out with radical initiators, in a temperature range of 120°–250° C.

5. Method for the continuous production of a molding mass which can be thermoplastically processed, according to claim 1, characterized in that polymerization is carried out at a reaction rate, with reference to the methyl methacrylate used, in the range of 40–90%, by means of continuous metering of the monomers, polymerization initiators, molecular weight regulators, and any other usual additives, by means of continuous removal of part of the polymerization mixture and subsequent separation of the volatile components of the polymer melt and subsequent granulation.

6. Molded elements made of a molding mass which can be thermoplastically processed, according to claim 1.

7. Molding mass which can be thermoplastically processed, characterized in that it consists of monomer units of
   a) 80–99.9 wt.-% methyl methacrylate,
   b) 0.1–20 wt.-% ethylene,
   c) 0–19.9 wt.-% other comonomers,
   wherein said other comonomers are selected from the group consisting of acrylic acid esters, methacrylic acid esters, (meth)acrylonitrile, (meth)acrylic acid amide, styrene, α-methyl styrene, vinyl esters, vinyl amides and maleic acid.

8. Molding mass which can be thermoplastically processed, according to claim 7, characterized in that it has a solution viscosity in chloroform according to ISO 1628-6 of 20–250 cm³/g.

9. Molding mass which can be thermoplastically processed, according to claim 7, characterized in that it has a solution viscosity in chloroform according to ISO 1628-6 of 40–200 cm³/g.

10. Molding mass which can be thermoplastically processed, according to claim 7, characterized in that the residual ethylene content is below 1000 ppm.

11. Method for the production of a molding mass which can be thermoplastically processed, according to claim 7, characterized in that polymerization is carried out with radical initiators, in a temperature range of 120°–250° C.

12. Method for the continuous production of a molding mass which can be thermoplastically processed, according to claim 7, characterized in that polymerization is carried out at a reaction rate, with reference to the methyl methacrylate used, in the range of 40–90%, by means of continuous metering of the monomers, polymerization initiators, molecular weight regulators, and any other usual additives, by means of continuous removal of part of the polymerization mixture and subsequent separation of the volatile components of the polymer melt and subsequent granulation.

13. Molded elements made of a molding mass which can be thermoplastically processed, according to claim 7.

14. Molding mass which can be thermoplastically processed, characterized in that it consists of monomer units of a) 91–99.8 wt.-% methyl methacrylate, b) 0.2–9 wt.-% ethylene, c) 0–8.8 wt.-% other comonomers, wherein said other comonomers are selected from the group consisting of acrylic acid esters, methacrylic acid esters, (meth)acrylonitrile, (meth)acrylic acid amide, styrene, α-methyl styrene, vinyl esters, vinyl amides and maleic acid.

15. Molding mass which can be thermoplastically processed, according to claim 14, characterized in that it has a solution viscosity in chloroform according to ISO 1628-6 of 20–250 cm$^3$/g.

16. Molding mass which can be thermoplastically processed, according to claim 14, characterized in that it has a solution viscosity in chloroform according to ISO 1628-6 of 40–200 cm$^3$/g.

17. Molding mass which can be thermoplastically processed, according to claim 14, characterized in that the residual ethylene content is below 1000 ppm.

18. Method for the production of a molding mass which can be thermoplastically processed, according to claim 14, characterized in that polymerization is carried out with radical initiators, in a temperature range of 120°–250° C.

19. Method for the continuous production of a molding mass which can be thermoplastically processed, according to claim 14, characterized in that polymerization is carried out at a reaction rate, with reference to the methyl methacrylate used, in the range of 40–90%, by means of continuous metering of the monomers, polymerization initiators, molecular weight regulators, and any other usual additives, by means of continuous removal of part of the polymerization mixture and subsequent separation of the volatile components of the polymer melt and subsequent granulation.

20. Molded elements made of a molding mass which can be thermoplastically processed, according to claim 14.

* * * * *

UNITED STATES PATENT AND TRADEMARK OFFICE
CERTIFICATE OF CORRECTION

PATENT NO. : 5,872,202
DATED : February 16, 1999
INVENTOR(S) : Werner SIOL et al It is certified that error appears in the above-identified patent and that said Letters Patent is hereby corrected as shown below:

Column 1, line 48, "Eiley" should read --Wiley--;

lines 64-65, "R ätzsch" should read --Rätzsch--.

Column 2, line 39, "heat shape retention" should read

--heat deflection temperature--.

Column 3, line 13, "Acryl and methacryl" should read

--Acrylic and Methacrylic--;

line 18, "mold parting agents" should read

--mold release agents--;

UNITED STATES PATENT AND TRADEMARK OFFICE
CERTIFICATE OF CORRECTION

PATENT NO. : 5,872,202
DATED : February 16, 1999
INVENTOR(S) : Werner SIOL et al It is certified that error appears in the above-identified patent and that said Letters Patent is hereby corrected as shown below:

lines 31-32; "dilauryl peroxide" should read

--dilauroylperoxide--;

line 34, "percetals" should read --perketals--;

line 36, "Acryl and methacryl" should read

--Acrylic and Methacrylic--;

lines 54-55, "Acryl and methacryl" should read

--Acrylic and Methacrylic--.

Column 4, line 8, "heat shape retention" should read

--heat deflection temperature--;

line 26, "reaction" should read --conversion--;

line 33, "inclusion" should read --incorporation--;

line 56, "stirrer" should read --stirred reactor--.

UNITED STATES PATENT AND TRADEMARK OFFICE
CERTIFICATE OF CORRECTION

PATENT NO. : 5,872,202
DATED : February 16, 1999
INVENTOR(S) : Werner SIOL et al It is certified that error appears in the above-identified patent and that said Letters Patent is hereby corrected as shown below:

Column 5, line 48, "has been broken down" should read
--has been depolymerized--;
line 61, "has been broken down" should read
--has been depolymerized--.
Column 6, line 18, "reaction rate" should read --conversion--;
line 56, "reaction rate" should read --conversion--.
Column 8, line 8, "reaction rate" should read --conversion--.

Signed and Sealed this

Twenty-first Day of March, 2000

*Attest:*

Q. TODD DICKINSON

*Attesting Officer*  *Commissioner of Patents and Trademarks*